United States Patent [19]

Nelson

[11] Patent Number: 4,727,125
[45] Date of Patent: Feb. 23, 1988

[54] THERMALLY ACTIVATED TWO COMPONENT METATHESIS CATALYST SYSTEM

[75] Inventor: Lawrence L. Nelson, Wilmington, Del.

[73] Assignee: Hercules Incorporated, Wilmington, Del.

[21] Appl. No.: 926,272

[22] Filed: Nov. 3, 1986

[51] Int. Cl.$^4$ .......................... C08F 4/44; C08F 32/00; C08F 36/00
[52] U.S. Cl. ...................................... 526/141; 526/281
[58] Field of Search ............... 526/128, 141, 161, 190, 526/281

[56] References Cited

U.S. PATENT DOCUMENTS

| | | | |
|---|---|---|---|
| 3,746,696 | 7/1973 | Judy | 526/141 |
| 3,935,179 | 1/1976 | Ofstead | 526/141 |
| 3,956,178 | 5/1976 | Greco | 526/141 |
| 4,020,254 | 4/1977 | Ofstead | 526/128 |
| 4,068,063 | 1/1978 | Ikeda | 526/281 |
| 4,380,617 | 4/1983 | Minchak | 526/161 |
| 4,568,660 | 2/1986 | Klosiewicz | 556/41 |

*Primary Examiner*—Paul R. Michl
*Assistant Examiner*—Mark B. Buscher
*Attorney, Agent, or Firm*—William S. Alexander

[57] ABSTRACT

Disclosed is a method of reducing the activation rate of an alkyl aluminum activator in the metathesis polymerization of strained ring cycloolefins. Activation rate is reduced by use of certain nucleophilic Lewis bases as the reaction rate moderator.

22 Claims, No Drawings

THERMALLY ACTIVATED TWO COMPONENT METATHESIS CATALYST SYSTEM

This invention relates to the polymerization of cycloolefins under the influence of an aluminum alkyl-activatedmetathesis catalyst system. In particular, it relates to an aluminum alkyl activator whose activation rate is significantly slower than that of presently used activator systems.

Preparation of thermoset cycloolefin polymers via metathesis catalysts is a relatively recent development in the polymer art. Klosiewicz in U.S. Pat. Nos. 4,400,340 and 4,520,181 teaches preparation of such polymers from dicyclopentadiene and other similar cycloolefins via a two-stream reaction injection molding technique wherein a first stream, including the catalyst, and a second stream, including a catalyst activator, are combined in a mix head and immediately injected into a mold where, within a matter of seconds, polymerization and molding to a permanently fixed shape take place simultaneously.

In the presence of a metathesis catalyst system, polymerization takes place extremely rapidly even at low temperatures. In fact, polymerization occurs so rapidly that it is not unusual for the monomer to polymerize to a solid, immobile condition before the mixed streams can be transferred to the mold. To overcome this difficulty, Klosiewicz teaches the inclusion of a reaction rate moderator in the activator stream to delay the catalyst activation until the reaction mass is totally within the mold. The total time from mixing until polymerization is substantially complete is still just a matter of seconds.

In the typical system, according to Klosiewicz, the catalyst component is a tungsten or molybdenum halide and the activator is an alkyl aluminum compound. The reaction rate moderator can be an ester, ether, ketone or nitrile.

Due to the extremely rapid rate of reaction of cycloolefins, even in the presence of the rate-moderated catalyst, useful polymerization has heretofore been accomplished almost exclusively by the reaction injection molding (RIM) process using the two-stream process of Klosiewicz. Even in RIM processes, the short gelation times limit the application to relatively small items and to relatively non-detailed molds with a minimum of sharp corners or "kiss-off" sections which tend to trap pockets of air if the mold is filled too rapidly or if the viscosity of the polymerization mass builds up so rapidly that the gelled monomer does not flow easily into corners or around blocked-out sections. The polymerization mass cannot readily be employed in thermoset molding techniques such as pour, rotational and resin transfer (RTM) molding applications which require relatively long mold filling times.

It has been found possible (see Leach U.S. Pat. No. 4,458,037) to extend the gelation time to as much as ten minutes at room temperature by use of a dialkyl aluminum iodide activator moderated by di-n-butyl ether. When heated to 80° C., this mixture polymerizes in about 15 seconds. This system is also unsatisfactory in procedures where filling of the mold takes place slowly since the mold temperature must be held low enough during the filling operation that the reaction mixture remains fluid until the mold is entirely filled and then raised to the reaction temperature. For commercially practical production rates to be attained, the differential between mold filling temperature and polymerization reaction temperature must be smaller than is possible using the catalyst of Leach.

It is the object of this invention to provide cycloolefin polymerization feedstreams having substantially increased gelation times at normal molding temperatures compared with such mixtures heretofore known.

In accordance with this invention, it has been found that the onset of gelation or viscosity build-up of metathesis polymerizable cycloolefins at temperatures up to at least about 80° C. can be significantly delayed by employing as a reaction rate moderator a sterically unhindered or partially unhindered nucleophilic Lewis base.

Sterically unhindered or partially unhindered nucleophilic Lewis bases which can be employed in the improved process of this invention are usually unsaturated cyclic amines such as, e.g., pyridine, 2-,3-,4-, or 3,4-disubstituted pyridines, 2-,2,3-di-, or 2,5-di-substituted pyrazines, quinoline and quinoxaline and cyclic saturated polycyclic amines such as hexamethylene tetramine and 1,4-diazabicyclo[2.2.2]octane. Other suitable nucleophilic Lewis bases include phenanthridine, pyrimidine, isoquinoline and substituted derivatives of these materials.

The sterically unhindered or partially unhindered nucleophilic Lewis bases can be employed in conjunction with conventional metathesis catalysts to polymerize any metathesis polymerizable cyclic olefin. Most strained ring non-conjugated cycloolefins are metathesis polymerizable. These include, for example, dicyclopentadiene, dicyclopentadiene oligomers, norbornene, norbornadiene, 4-alkylidene norbornenes, dimethanooctahydronaphthalene, dimethanohexahydronaphthalene and substituted derivatives of these compounds. The preferred cyclic olefin monomer is dicyclopentadiene or a mixture of dicyclopentadiene with other strained ring hydrocarbons in ratios of 1 to 99 mole % of either monomer, preferably about 75 to 99 mole % dicyclopentadiene.

The metathesis catalyst system is comprised of two parts, i.e., a catalyst component and an activator. The catalyst component can be either a molybdenum or a tungsten halide or such a halide having two valences satisfied by oxygen rather than halogen. The preferred catalyst component is a tungsten halide, and preferably a mixture or complex of tungsten hexachloride ($WCl_6$) and tungsten oxytetrachloride ($WOCl_4$) in a molar ratio of $WOCl_4$ to $WCl_6$ of about 1:9 to 2:1. This mixture or complex is prepared by contacting essentially pure $WCl_6$ with a controlled portion of an oxygen donor. Useful oxygen donors include, e.g., oxygen, a hydrated salt, water, a wet molecular sieve and alkyl alcohols. The most preferred oxygen donor is t-butanol. Complete details of the catalyst preparation can be found in Klosiewicz, U.S. Pat. No. 4,568,660.

The tungsten or molybdenum compound is not normally soluble in the cycloolefin, but can be solubilized by complexing it with a phenolic compouhnd. The compound is first suspended in a small amount of an inert diluent such as benzene, toluene, xylene or chlorinated benzene to form a 0.1 to 1 mole per liter slurry. The phenolic compound is added to the slurry in a molar ratio of about 1:1 to 1:3 catalyst compound to phenolic compound and a stream of dry inert gas is passed through the agitated solution to remove hydrogen chloride gas. Preferred phenolic compounds include phenol, alkyl phenols, halogenated phenols or phenolic salts such as lithium or sodium phenoxide. The most preferred phenolic compounds are t-butyl phenol, t-octyl phenol and nonyl phenol.

To prevent premature polymerization of the catalyst component/monomer solution, which would occur within a matter of hours, about 1 to 5 moles of a Lewis base or a chelating agent are added per mole of catalyst compound. Preferred chelants include acetylacetones, dibenzoyl methane and alkyl acetoacetates, where the alkyl group contains from 1 to 10 carbon atoms. Preferred Lewis bases are nitriles and ethers such as benzonitrile and tetrahydrofuran. The improvement in stability and shelf-life of the catalyst component/monomer solution is obtained whether the complexing agent is added before or after the phenolic compound. When this complexed catalyst component is added to purified cycloolefin, for example dicyclopentadiene, it forms a solution which is stable and has a shelf-life of several months in the absence of an activator.

The second part of the metathesis catalyst system is the activator, which is an alkyl aluminum or an alkyl tin compound. The alkyl aluminum compounds, either trialkyl aluminum or dialkyl aluminum halide, are preferred. Particularly preferred as a dialkyl aluminum halide with an alkyl moiety containing 1 to 12 carbon atoms and iodide as the halide. The activator is readily soluble in the cycloolefin. The activator is prepared by mixing the alkyl aluminum compound or mixture of alkyl aluminum compounds with the Lewis base or mixture of Lewis bases at a 1:1 to 1:5 molar ratio. While either order of addition, i.e., Lewis base to alkyl aluminum compound or alkyl aluminum compound to Lewis base, can be used, it is preferred to add the Lewis base to the alkyl aluminum with agitation. The reaction is highly exothermic, and it is desirable to control the rate of Lewis base addition to the alkyl aluminum compound so as to maintain the temperature at less than approximately 50° C. to prevent decomposition of the rate moderator complex. In the case of solid Lewis bases, the base can be added as the solid or dissolved in a suitable nonreactive solvent such as toluene. The activator can also be prepared by dissolving or suspending the Lewis base in the cycloolefin and adding the alkyl aluminum component.

When the two parts of the catalyst system are combined, the resulting cycloolefin (for example dicyclopentadiene) to catalyst compound ratio will be from about 500:1 to about 15,000:1 on a molar basis, preferably 2,000:1 and the catalyst compound to alkyl aluminum ratio will be from about 1:2 to about 1:5.

A cycloolefin reaction mixture moderated by a sterically unhindered or partially unhindered Lewis base according to this invention remains fluid for a relatively long time at room temperature prior to forming a gel. As long a time as 1 to 4 hours can be required for gel formation at room temperature. Thus, the catalyst components need not be mixed and immediately injected into a mold. While the RIM technique can be employed, processing is not limited to the RIM technique. Moreover, the RIM technique can be used with a premixed reactive solution (i.e., cycloolefin containing both catalyst and activator) and materials can be charged directly into the heated mold without using a mix head on the molding machine.

The great advantage of using the moderators of this invention results from the extended gel time that they provide at convenient molding temperatures, i.e., about 80° C. At 80° C., the gel time can be extended to as long as three minutes and more; whereas solutions containing conventional rate moderators gel within 15 to 20 seconds at most. This extended gel time, during which the reaction mixture remains highly fluid, allows the reaction mixture to be used in techniques where molds are filled slowly. For example, the mixture can be employed in rotational molding where centrifugal force is employed to distribute the mixture and where the polymerization reaction cannot start until uniform distribution is achieved. The mixtures are also useful in preparing polymer articles filled with glass or other fibrous mat reinforcement where the mixture must remain fluid until it has completely impregnated the mat. Manufacture of large objects, where the volume of the mold, per se, necessitates long filling time, can also be facilitated by using the moderators of this invention. Using the moderators described in this invention, molds can be charged at the polymerization temperature in most cases.

In the known processes, wherre RIM processing is usually contemplated, combining of the components is most conveniently accomplished by mixing equal parts of two solutions, one of which contains twice the desired concentration of catalyst component, and the other of which contains twice the desired concentration of activator. This is possible, but not necessary, when the rate moderators contemplated herein are employed. Since the reactive mixture does not gel immediately, it is frequently convenient to add one part of the system to substantially all of the cycloolefin and, just prior to the polymerization and molding, add a concentrate of the other part.

The invention is illustrated by the following examples. In these examples, the catalyst component was prepared by suspending a $WCl_6/WOCl_4$ complex in toluene, reacting it with phenol to solubilize it and complexing it with acetyl acetone. This product was then diluted to a 0.1 molar concentration by adding sufficient additional toluene. A 1.0 molar toluene solution of an 85:15 molar mixture of tri-n-octyl aluminum (TNOA) and dioctyl aluminum iodide (DOAI) was prepared. One equivalent of bis(methoxy)ethyl ether (diglyme) per mole of combined TNOA and DOAI was added to form a standard, state-of-the-art control activator for dicyclopentadiene polymerization.

CONTROL EXAMPLE

To a nitrogen-sparged vessel was charged 5 volumes of dicyclopentadiene. To this was added 0.06 volume of the standard 85:15 TNOA/DOAI mixture, and the mass was mixed well. After the mixing, 0.2 volume of the 0.1M tungsten catalyst component solution was injected and mixed well. The vessel was immersed in a constant temperature bath maintained at 80° C.

The same procedure was simultaneously carried out using a 1.0M TNOA solution free of DOAI as the activator.

The time from addition of the tungsten catalyst component until formation of a non-fluid gel was noted and recorded as the gel time. Similarly the time from addition of the catalyst until the temperature reaches one-half of the final exotherm temperature was noted and recorded as the induction time or cure time. For these control examples, these values are recorded in Table I.

EXAMPLES 1 TO 9

The procedure used to test the control or standard activators was followed using similar molar quantities of various cyclic and polycyclic amines in place of diglyme. Moderators tested and the gel and cure times achieved therewith are recorded in Table I.

TABLE I

| Example No. | Activator | Moderator | Gel Time (sec.) | Cure Time (sec.) |
|---|---|---|---|---|
| Control | TNOA/DOAI | diglyme | 5 | 15 |
| Control | TNOA | diglyme | 3 | 15 |
| 1 | TNOA/DOAI | pyridine | 125 | 140 |
| 2 | TNOA/DOAI | 4-Et-pyridine | 196 | 239 |
| 3 | TNOA/DOAI | DABCO* | 90 | 174 |
| 4 | TNOA/DOAI | HMTA** | 120 | 175 |
| 5 | TNOA/DOAI | 2,4-di-Me-pyridine | 32 | 48 |
| 6 | TNOA/DOAI | 3-Et-pyridine | 150 | 172 |
| 7 | TNOA | pyridine | 77 | 83 |
| 8 | TNOA/DOAI | 2,6-di-Me-pyridine | 1 | 9 |
| 9 | TNOA/DOAI | 2-Et-pyridine | 12 | 25 |

*1,4-diazabicyclo[2.2.2]octane
**hexamethylene tetramine

The data from Examples 1 through 7 clearly show the significant increase in gel and cure times of the dicyclopentadiene solutions containing the unhindered unsaturated cyclic amines and the unhindered polycyclic amines. It will be noted, that among these examples, the fastest acting systems using compounds according to this invention are Examples 5 and 9, wheein the amines are partially hindered and thus exert a limited moderating effect. In Example 8, the amine is hindered on both sides and is thus totally ineffective in delaying the reaction.

EXAMPLE 10

In this example, the activator was the 85:15 TNOA/DOAI mixture containing an equimolar amount of a mixture of pyridine and diglyme. Polymerization of dicyclopentadiene with this activator/moderator shows the possibility of controlling the gel and cure times at a preselected point to fit a specified molding application. Relevant data are recorded in Table II.

TABLE II

| Example No. | Al:PY:DG Ratio | Gel Time (sec.) | Cure Time (sec.) |
|---|---|---|---|
| Control | 1:0:1 | 5 | 15 |
| 10-A | 1:0.2:0.8 | 8 | 13 |
| 10-B | 1:0.4:0.6 | 10 | 21 |
| 10-C | 1:0.6:0.4 | 62 | 73 |
| 10-D | 1:0.8:0.2 | 110 | 125 |
| Ex. 1 | 1:1:0 | 125 | 140 |

EXAMPLES 11 AND 12

Example 1 was repeated, except that, after combining the catalyst and activator with the dicyclopentadiene and mixing, the mixtures were allowed to age at room temperature under nitrogen (Example 11) or in a vacuum (Example 12). At one hour intervals, an aliquot of the mixture was inserted into an 80° C. water bath to polymerize it. Results of these experiments, reported in Table III, show the relatively long room temperature shelf-life of the polymerizable feed compositions and also demonstrate that the slow activation rate at 80° C. is retained after aging.

TABLE III

| Example No. | Aging Time (hr.) | Cure Time (sec.) |
|---|---|---|
| 11 | 0 | 142 |
|  | 1 | 123 |
|  | 2 | 116 |
|  | 3 | 132 |
|  | 4.5* | 192 |
| 12 | 0 | 142 |
|  | 1 | 130 |
|  | 2* | 163 |

*Stiff gel had formed by this time.

EXAMPLES 13 AND 14

Catalyst and activator streams were prepared for a molding trial in an Accuratio ™ reaction injection molding machine. The catalyst stream was comprised of 7.5 lb. of dicyclopentadiene containing 6 wt. % solution-polymerized random styrene-butadiene rubber (Stereon 720A by B. F. Goodrich), 97 ml. of 0.5M tungsten catalyst, 24 ppm rose oxide and 1 wt. % Irganox 1070 (antioxidant). The activator stream was prepared by mixing 145 ml. of a 1M alkyl aluminum activator solution with 7.5 lbs. of the rubberized dicyclopentadiene to give a molar ratio of dicyclopentadiene:Al of 500:3. The two component streams were mixed 1 to 1 in a mix head and injected into a 10"×10"×⅛" thick plaque mold, which was maintained at approximately 80° C. The final dicyclopentadiene:W:Al ratio was 1,000:1:3.

The alkyl aluminum activator in Example 13 was TNOA moderated with an equivalent amount of a 50:50 molar mixture of pyridine and diglyme and in Example 14, it was an 85:15 molar mixture of TNOA and DOAI with the same moderator mixture.

Relevant data and physical properties are presented in Table IV.

TABLE IV

Comparison of Poly(dicyclopentadiene) Physical Properties Of Accuratio RIM Plaques
Dicyclopentadiene:W:Al = 1,000:1:3

|  | Example 13 | Example 14 | Standard |
|---|---|---|---|
| Mold temperature (°C.) | 80 | 85 | 80 |
| Gel time (sec.) | 40–51 | 44–58 | — |
| Demold time (sec.) | 55–110 | 90–120 | — |
| Flex modulus (kpsi) | 224 | 224 | 260 |
| Flex strength (kpsi) | 8.4 | 10.3 | 10 |
| Tensile modulus (kpsi) | 176 | 191 | 160 |
| Tensile strength (kpsi) | 4.6 | 5.2 | 5 |
| Plate impact (ft lbs) | 9.8 | 13.3 | 11 |
| Density (gm/cc) | 0.98 | 0.99 | — |

EXAMPLE 15

A series of polymerizations was carried out wherein the alkyl aluminum activator was DOAI moderated with cyclic unsaturated tertiary amines. In each case a 1.0M toluene solution of DOAI was mixed with an equimolar amount of one of the amines. Each of these mixtures was used to polymerize dicyclopentadiene as described in the Control Example. Relevant gel and cure time data are recorded in Table V.

TABLE V

| Example No. | Moderator | Gel Time (sec.) | Cure Time (sec.) |
|---|---|---|---|
| Control | n-butyl ether | 15 | 22 |
| 15 | quinoxaline | 31 | 40 |
| 16 | pyrazine | 171 | 243 |
| 17 | 2,3-dimethyl pyrazine | 43 | 53 |

TABLE V-continued

| Example No. | Moderator | Gel Time (sec.) | Cure Time (sec.) |
|---|---|---|---|
| 18 | 2,5-dimethyl pyrazine | 63 | 72 |

EXAMPLES 19 TO 22

A series of experiments were run wherein dimethanooctahydronaphthalene was polymerized instead of dicyclopentadiene. Activators and moderators were as described in Table VI. Relevant gel and cure times are also recorded in Table VI.

TABLE VI

| Example No. | Activator | Moderator | Gel Time (sec.) | Cure Time (sec.) |
|---|---|---|---|---|
| Control | DOAI | n-butyl ether | 18 | 27 |
| 19 | DOAI | quinoxaline | 40 | 73 |
| 20 | DOAI | quinoline | 202 | 532 |
| 21 | DOAI | 4-phenyl pyridine | 545 | 612 |
| 22 | DOAI | DABCO | 113 | 174 |

What is claimed is:

1. In a process for preparing molded objects wherein a liquid reaction mass comprised of a metathesis polymerizable cycloolefin, a metathesis polymerization catalyst, an alkyl aluminum catalyst activator and a reaction rate moderator are charged to a mold wherein polymerization will take place, the improvement wherein said reaction rate moderator comprises a sterically unhindered or partially unhindered nucleophilic Lewis base selected from the class consisting of unsaturated cyclic amines and saturated polycyclic amines.

2. The process of claim 1 wherein the catalyst activator comprises a dialkyl aluminum halide wherein the alkyl groups have about 2 to 10 carbon atoms.

3. The process of claim 2 wherein the dialkyl aluminum halide comprises dialkyl aluminum iodide.

4. The process of claim 2 or 3 wherein the nucleophilic Lewis base is an unsaturated cyclic amine.

5. The process of claim 4 wherein the unsaturated cyclic amine is selected from the class consisting of pyridine, substituted pyridines, pyrazine, substituted pyrazines, quinoline and quinoxaline.

6. The process of claim 5 wherein the unsaturated cyclic amine is pyridine.

7. The process of claim 5 wherein the unsaturated cyclic amine is 3-ethyl pyridine.

8. The process of claim 5 wherein the unsaturated cyclic amine is 4-ethyl pyridine.

9. The process of claim 5 wherein the unsaturated cyclic amine is pyrazine.

10. The process of claim 2 or 3 wherein the reaction rate moderator is a saturated polycyclic amine.

11. The process of claim 10 wherein the saturated polycyclic amine is hexamethylene tetramine or 1,4-diazabicyclo[2.2.2]octane.

12. A polymerization feed composition comprising:
    (a) a metathesis polymerizable cycloolefin;
    (b) a metathesis polymerization catalyst; and
    (c) a catalyst activator comprising an alkyl aluminum compound and a reaction rate moderator comprising a sterically unhindered or partially unhindered nucleophilic Lewis base selected from the class consisting of unsaturated cyclic amines and saturated polycyclic amines.

13. The composition of claim 12 wherein the catalyst activator comprises a dialkyl aluminum halide wherein the alkyl groups have about 2 to 10 carbon atoms.

14. The composition of claim 13 wherein the dialkyl aluminum halide comprises dialkyl aluminum iodide.

15. The composition of claim 13 or 14 wherein the reaction rate moderator comprises an unsaturated cyclic amine.

16. The composition of claim 15 wherein the unsaturated cyclic amine is selected from the class consisting of pyridine, substituted pyridines, pyrazine, substituted pyrazines, quinoline and quinoxaline.

17. The composition of claim 16 wherein the unsaturated cyclic amine is pyridine.

18. The composition of claim 16 wherein the unsaturated cyclic amine is 3-ethyl pyridine.

19. The composition of claim 16 wherein the unsaturated cyclic amine is 4-ethyl pyridine.

20. The composition of claim 16 wherein the unsaturated cyclic amine is pyrazine.

21. The composition of claim 13 or 14 wherein the reaction rate moderator is a saturated polycyclic amine.

22. The composition of claim 21 wherein the saturated polycyclic amine is hexamethylene tetramine or 1,4-diazabicyclo[2.2.2]octane.

* * * * *